United States Patent
Gueron et al.

(10) Patent No.: US 8,923,510 B2
(45) Date of Patent: Dec. 30, 2014

(54) METHOD AND APPARATUS FOR EFFICIENTLY IMPLEMENTING THE ADVANCED ENCRYPTION STANDARD

(75) Inventors: Shay Gueron, Haifa (IL); Michael E. Kounavis, Portland, OR (US); Ram Krishnamurthy, Portland, OR (US); Sanu K. Mathew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1144 days.

(21) Appl. No.: 11/966,658

(22) Filed: Dec. 28, 2007

(65) Prior Publication Data

US 2009/0172068 A1 Jul. 2, 2009

(51) Int. Cl.
*H04L 9/00* (2006.01)
*G06F 7/00* (2006.01)

(52) U.S. Cl.
CPC ............................... *G06F 7/00* (2013.01)
USPC .................. 380/29; 380/28; 380/44; 708/492

(58) Field of Classification Search
CPC ........... G06F 7/726; G06F 7/724; G06F 7/38; H04L 9/0637; H04L 2209/20; H04L 9/0631; H04L 9/06; H04L 9/28
USPC ................................ 380/28, 29, 44; 708/492
See application file for complete search history.

(56) References Cited

U.S. PATENT DOCUMENTS

| | | | |
|---|---|---|---|
| 7,512,647 B2 * | 3/2009 | Wilson et al. ................. | 708/492 |
| 2004/0184602 A1 * | 9/2004 | Nadehara ......................... | 380/28 |
| 2006/0093136 A1 * | 5/2006 | Zhang et al. .................... | 380/29 |

FOREIGN PATENT DOCUMENTS

WO WO2004/014016 * 8/2003

OTHER PUBLICATIONS

Satoh et al, "A Compact Rijndael Hardware Architecture with S-Box Optimization" 7th International Conference on the Theory and Application of Cryptology and Information Security Gold Coast, Australia, Dec. 9-13, 2001 Proceedings.*
Gaj et al, "FPGA and ASIC Implementations of AES" ECE Deperment, George Mason University, USA, 2007, pp. 1-60.*
Kirillov et al.,"The use of finite Field GF (256) in the performance primitives Intel IPP" Oct, 7, 2008, pp. 1-12.*
Morioka et al., "An Optimized S-BoxCircuit Architecture for Low Power AES Design," Presentation, IBM Japan Ltd., Tokyo Research Laboratory, (CHES 2002) Aug. 13, 2002.

(Continued)

*Primary Examiner* — Harunur Rashid
(74) *Attorney, Agent, or Firm* — Mnemoglyphics, LLC; Lawrence M. Mennemeier

(57) ABSTRACT

Implementations of Advanced Encryption Standard (AES) encryption and decryption processes are disclosed. In one embodiment of S-box processing, a block of 16 byte values is converted, each byte value being converted from a polynomial representation in GF(256) to a polynomial representation in $GF((2^2)^4)$. Multiplicative inverse polynomial representations in $GF((2^2)^4)$ are computed for each of the corresponding polynomial representations in $GF((2^2)^4)$. Finally corresponding multiplicative inverse polynomial representations in $GF((2^2)^4)$ are converted and an affine transformation is applied to generate corresponding polynomial representations in GF(256). In an alternative embodiment of S-box processing, powers of the polynomial representations are computed and multiplied together in GF(256) to generate multiplicative inverse polynomial representations in GF(256). In an embodiment of inverse-columns-mixing, the 16 byte values are converted from a polynomial representation in GF(256) to a polynomial representation in $GF((2^4)^2)$. A four-by-four matrix is applied to the transformed polynomial representation in $GF((2^4)^2)$ to implement the inverse-columns-mixing.

18 Claims, 4 Drawing Sheets

(56) References Cited

OTHER PUBLICATIONS

Rudra et al., "Efficient Rijndael Encryption Implementation with Composite Field Arithmetic," In Proceedings, Workshop on Cryptographic Hardware and Embedded Systems (CHES 2001) pp. 175-188, 2001.

Gueron et al., "Masked Inversion in GF(2n) Using Mixed Field Representations and its Efficient Implementation AES," Embedded Cryptographic Hardware: Methodologies & Architectures, Nadia Nedjah and Luiza de Macedo Mourelle (Editors), Nova Science Publishers, Inc. (ISBN: 1-59454-012-8), 2004.

"Advanced Encryption Standard," Federal Information Processing Standards Publication 197, available at http//csrc.nist.gov/publications/fips, 51 pages.

* cited by examiner

US 8,923,510 B2

METHOD AND APPARATUS FOR EFFICIENTLY IMPLEMENTING THE ADVANCED ENCRYPTION STANDARD

FIELD OF THE DISCLOSURE

This disclosure relates generally to the field of encryption/decryption systems. In particular, the disclosure relates to efficient implementations of the Advanced Encryption Standard.

BACKGROUND OF THE DISCLOSURE

The Advanced Encryption Standard (AES), also known as Rijndael, is a block cipher developed by two Belgian cryptographers, Joan Daemen and Vincent Rijmen and adopted as an encryption standard by the United States government. AES was announced in Nov. 26, 2001 by the National Institute of Standards and Technology (NIST) as U.S. FIPS PUB 197 (FIPS 197).

AES has a fixed block size of 128 bits and a key size of 128, 192 or 256 bits. Key expansion using Rijndael's key schedule transforms the keys of size 128, 192 or 256 bits into 10, 12 or 14 round keys of 128 bits. The round keys are used to process the plaintext data in rounds as 128-bit blocks (viewed as 4-by-4 arrays of bytes) and convert them to ciphertext blocks. Typically, for a 128-bit input to the round (16 bytes) each byte is replaced by another byte according to a lookup table called the S-box. This portion of the block cipher is called SubBytes. Next the rows of bytes (viewed as a 4-by-4 array) are cyclically shifted or rotated left by a particular offset (i.e. row zero by 0 bytes, row one by 1 byte, row two by 2 bytes and row three by 3 bytes). This portion of the block cipher is called ShiftRows. Then each of the columns of bytes are viewed as four coefficients of a polynomial in a finite field, $GF(256)$ (also called Galois field $2^8$), and multiplied by an invertible linear transformation. This portion of the block cipher is called MixColumns. Finally, the 128-bit block is XORed with a round key to produce a ciphertext block of 16 bytes, which is called AddRoundKey.

On systems with 32-bit or larger words, it is possible to implement the AES cipher by converting the SubBytes, ShiftRows and MixColumns transformations into four 256-entry 32-bit tables, which utilize 4096 bytes of memory. One drawback to a software implementation is performance. Software runs orders of magnitude slower than devoted hardware so it is desirable to have the added performance of a hardware/firmware implementation.

Typical straightforward hardware implementations using lookup memories, truth tables, binary decision diagrams or 256 input multiplexers are costly in terms of circuit area. Alternative approaches using finite fields isomorphic to $GF(256)$ may be efficient in area but may also be slower than the straightforward hardware implementations. Thus options that provide efficient space-time design tradeoffs have not been fully explored.

DESCRIPTION OF THE DRAWINGS

The present invention is illustrated by way of example and not limitation in the figures of the accompanying drawings.

DETAILED DESCRIPTION

Implementations of Advanced Encryption Standard (AES) encryption and decryption processes are disclosed. In one embodiment of S-box processing, a block of 16 byte values is converted, each byte value being converted from a polynomial representation in $GF(256)$ to a polynomial representation in $GF(2^2)^4)$. Multiplicative inverse polynomial representations in $GF((2^2)^4)$ are computed for each of the corresponding polynomial representations in $GF((2^2)^4)$. Finally corresponding multiplicative inverse polynomial representations in $GF((2^2)^4)$ are converted and an affine transformation is applied to generate corresponding polynomial representations in $GF(256)$. In an alternative embodiment of S-box processing, powers of the polynomial representations are computed and multiplied together in $GF(256)$ to generate multiplicative inverse polynomial representations in $GF(256)$. In an embodiment of inverse-columns-mixing, the 16 byte values are converted from a polynomial representation in $GF(256)$ to a polynomial representation in $GF((2^4)^2)$. A four-by-four matrix is applied to the transformed polynomial representation in $GF((2^4)^2)$ to implement the inverse-columns-mixing.

The AES encryption and decryption processes have useful applications in data encryption and decryption as a block cipher and is widely used. It is one of the most popular algorithms used in symmetric key cryptography for secure financial transactions, identification, digital signatures, and communication privacy. Such application in the technical arts include but are not limited to secure bank transactions and fund transfers, authorization to accounts, private communications over public networks, security of intellectual property assets, etc.

Efficient hardware implementations of AES encryption and decryption processes allow for real time encrypted data in standard encrypted formats. Encrypted data formats for certain particular data or signal types such as communications, financial transactions, audio or motion video for example, which are representative of or constitute communication, physical activity or objects require and can utilize the improved performance of more efficient hardware/firmware implementations as herein disclosed.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Figure 1:
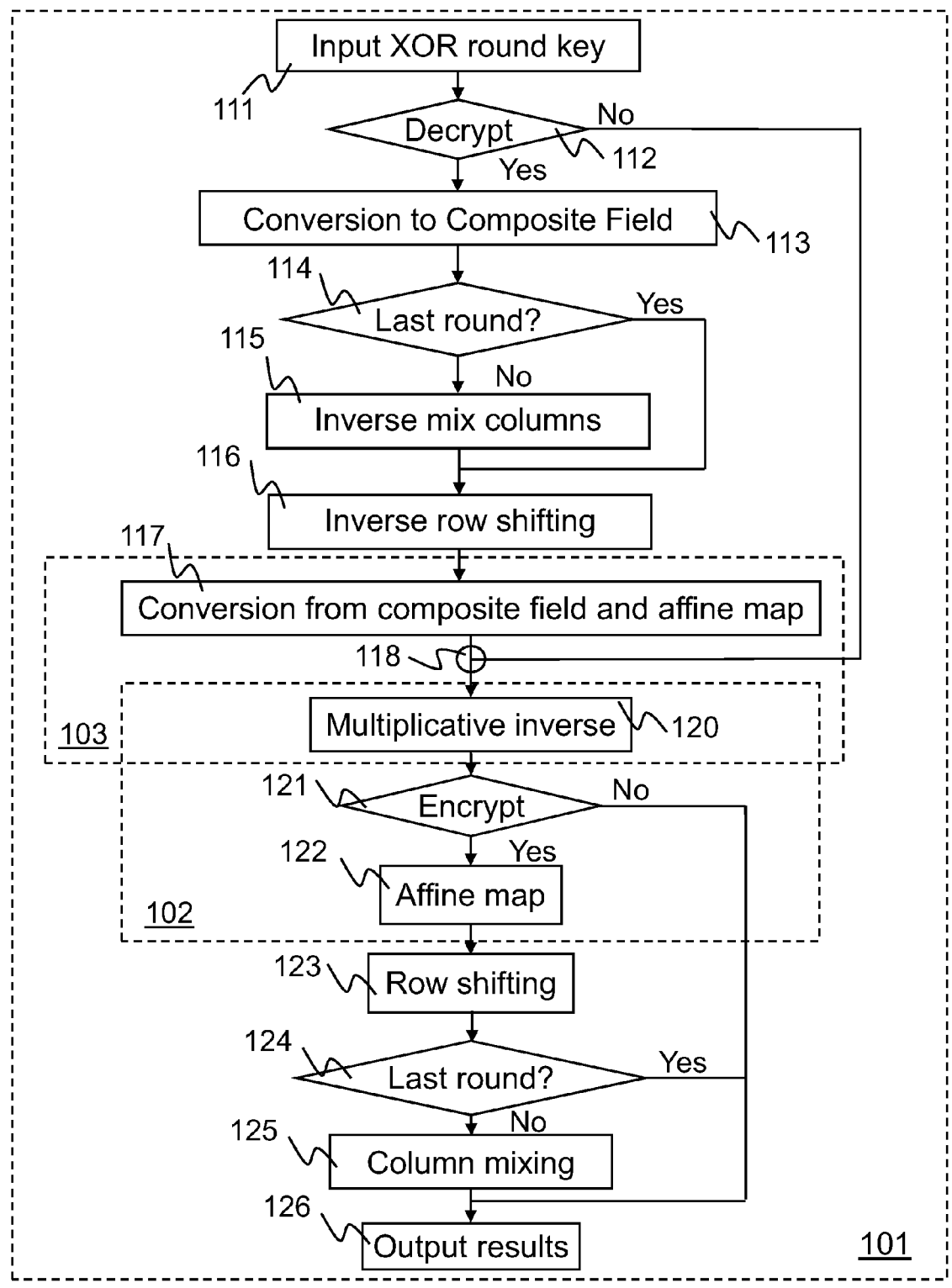
FIG. 1 illustrates a flow diagram for one embodiment of a process for efficiently implementing the Advanced Encryption Standard (AES) encryption/decryption standard.

FIG. 1 illustrates a flow diagram for one embodiment of a process 101 for efficiently implementing rounds of the Advanced Encryption Standard (AES) encryption/decryption standard. Process 101 and other processes herein disclosed are performed by processing blocks that may comprise dedicated hardware or software or firmware operation codes executable by general purpose machines or by special purpose machines or by a combination of both. In the example illustrated below the composite field $GF((2^4)^2)$ is used with the irreducible polynomial, $x^4+x^2+x+1$ and $s^2+2x+0xE$, for the AES inverse-columns-mix transformation.

In processing block 111 a 128-bit input block including 16 byte values is logically exclusive-ORed (XORed) with a round key. In processing block 112 it is determined whether the process is encrypting, in which case processing continues from point 118, or if the process is decrypting, in which case processing resumes in processing block 113.

In processing block 113 a field conversion circuit is used to convert each of the 16 byte values, respectively, from a corresponding polynomial representation in GF(256) to another corresponding polynomial representation in the composite field $GF(2^4)^2$. For one embodiment of processing block 113, a polynomial representation in GF(256), $[a_7, a_6, a_5, a_4, a_3, a_2, a_1, a_0]$, can be converted to a corresponding polynomial representation in the composite field $GF((2^4)^2))$, $[b_7, b_6, b_5, b_4, b_3, b_2, b_1, b_0]$, by multiplication of each byte value with an 8-bit by 8-bit conversion matrix, which may be implemented by a series of XORs as follows:

$b_0 = a_0 \oplus a_2 \oplus a_3 \oplus a_4 \oplus a_5 \oplus a_6 \oplus a_7$,
$b_1 = a_7$,
$b_2 = a_4 \oplus a_5 \oplus a_7$,
$b_3 = a_1 \oplus a_3 \oplus a_5 \oplus a_6$,
$b_4 = a_4 \oplus a_5 \oplus a_6$,
$b_5 = a_1 \oplus a_4 \oplus a_5 \oplus a_6$,
$b_6 = a_5 \oplus a_7$,
$b_7 = a_2 \oplus a_3 \oplus a_4 \oplus a_6 \oplus a_7$.

At this point the 16 bytes may be viewed a four-by-four block of bytes having four rows and having four columns. In processing block 114 it is determined if the present round is the last/special round, in which case no inverse column mixing is performed, or otherwise in processing block 115 an inverse-columns-mixing circuit is used to compute an inverse-columns-mixing transformation in $GF(2^4)^2$ of the 16 byte values to get corresponding transformed polynomial representations in $GF(2^4)^2$. For one embodiment the inverse-columns-mixing transformation in $GF(2^4)^2$ of the 16 byte input values can be performed as follows:

$$\text{Output} = \begin{vmatrix} 0\times20 & 0\times40 & 0\times09 & 0\times88 \\ 0\times88 & 0\times20 & 0\times40 & 0\times09 \\ 0\times09 & 0\times88 & 0\times20 & 0\times40 \\ 0\times40 & 0\times09 & 0\times88 & 0\times20 \end{vmatrix} \cdot \text{input}$$

It will be appreciated that such a matrix multiplication can be performed on $[a_3, a_2, a_1, a_0, b_3, b_2, b_1, b_0]$ in $GF(2^4)^2$ by computing, in a first stage, the unique terms needed to perform the multiplications by the matrix constants in the expression for each result, and then summing the unique terms to generate each result. For example the unique terms necessary for computing the above matrix multiplication, from the nibble $[a_3, a_2, a_1, a_0]$, are: $(a_3 \oplus a_0) \oplus a_1$, $(a_2 \oplus a_1) \oplus a_3$, $(a_2 \oplus a_0) \oplus a_1$, $(a_3 \oplus a_2) \oplus a_0$, $a_3 \oplus a_1$, $(a_3 \oplus a_2)+(a_1 \oplus a_0)$. The unique terms necessary for computing the above matrix multiplication, from the nibble $[b_3, b_2, b_1, b_0]$, are:
$(b_3 \oplus b_2) \oplus b_1$, $(b_2 \oplus b_1) \oplus b_3$, $b_3 \oplus b_0$, $b_3 \oplus b_1$, $b_1 \oplus b_0$, $(b_3 \oplus b_0)+(b_1 \oplus b_2)$.

In any case of what is determined in processing block 114, in processing block 116 a hard-wired permutation of the rows is performed on the 16 byte values corresponding to an inverse row mixing transformation. In processing block 117 a second field conversion circuit is used to convert each corresponding transformed polynomial representation in $GF(2^4)^2$ and also to apply an inverse affine transformation to generate, respectively, a third corresponding polynomial representation in a finite field other than $GF(2^4)^2$. In one embodiment of process 101 that new finite field other than $GF(2^4)^2$ is the composite field $GF(2^2)^4$. This embodiment is described below in greater detail with regard to FIG. 2. In an alternative embodiments of process 101 that new finite field is the original field GF(256). These embodiments are described below in greater detail with regard to FIGS. 3a and 3b.

Continuing from point 118, a multiplicative inverse circuit is used in processing block 120 to compute, for each of the third corresponding polynomial representations of the 16 byte values respectively, a corresponding multiplicative inverse polynomial representation in that new finite field other than $GF(2^4)^2$. In processing block 121 it is determined whether the process is decrypting, in which case round processing is finished and outputs a result in processing block 126, or if the process is encrypting, in which case processing resumes in processing block 122.

In processing block 122 a circuit is used to apply an affine transformation to each corresponding multiplicative inverse polynomial representation of the 16 byte values to generate, respectively, a transformed corresponding polynomial representation in that new finite field other than $GF(2^4)^2$. If that new finite field is not the original field GF(256), then another field conversion can be combined with the circuit in block 122 to convert each corresponding transformed polynomial representation back to the original field GF(256). Therefore, it may be assumed that the polynomial representation for the remainder of process 101 is in the original field GF(256).

In processing block 123 a hard-wired permutation of the rows is performed on the 16 byte values corresponding to a forward row mixing transformation. In processing block 124 it is determined if the present round is the last/special round, in which case no column mixing is performed, or otherwise in processing block 125 a forward-columns-mixing circuit is used to compute a forward-columns-mixing transformation in GF(256) of the 16 byte values to get corresponding transformed polynomial representations in GF(256). It will be appreciated that because coefficients are relatively small in the forward-columns-mixing transformation in GF(256), no alternative field representation is used in processing block 125. Finally, the round processing of process 101 is finished and the 16 byte result is output in processing block 126.

Figure 2:
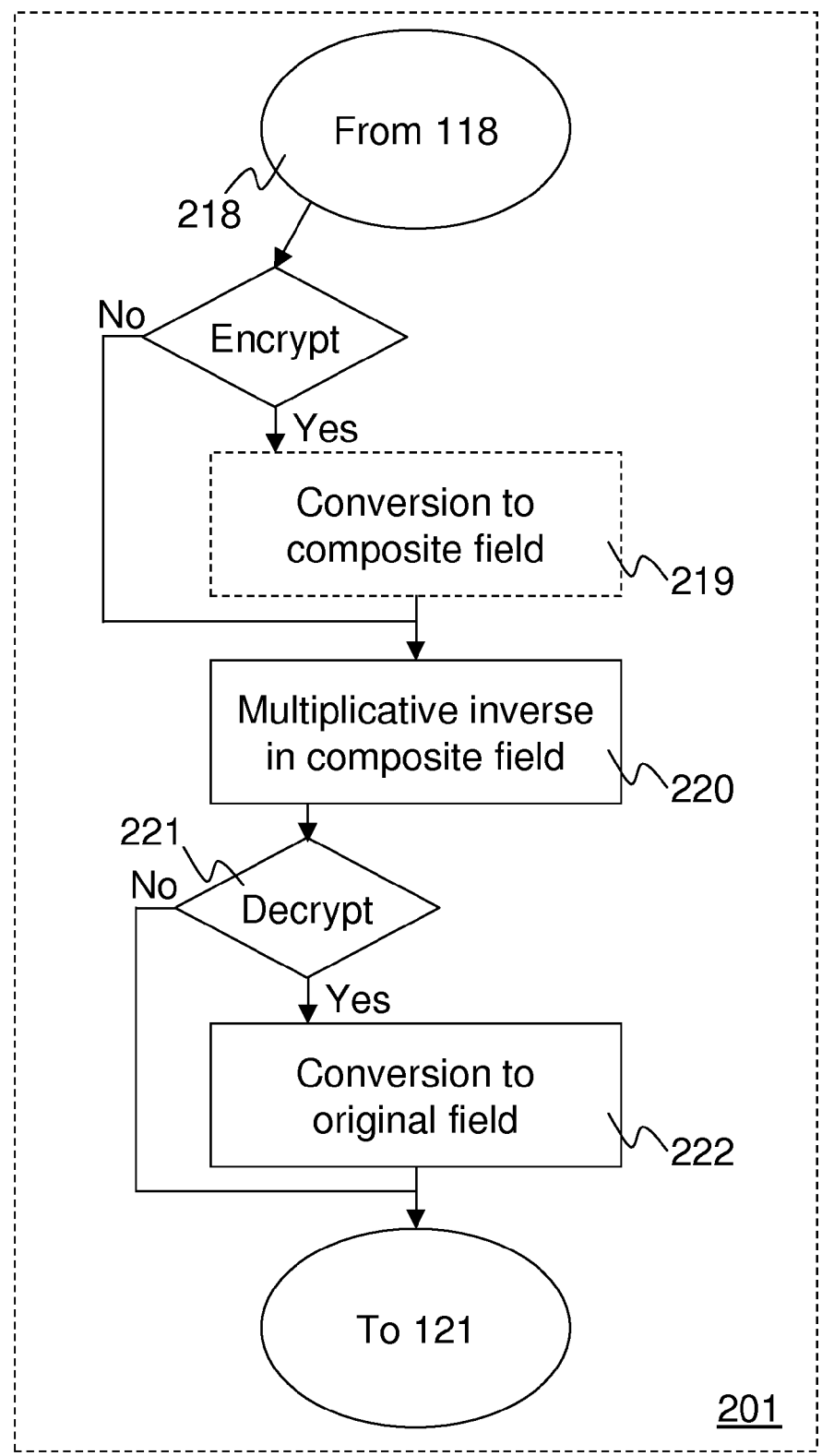
FIG. 2 illustrates a flow diagram for one embodiment of a process for efficiently implementing a multiplicative inverse of an AES S-box.

FIG. 2 illustrates a flow diagram for one embodiment of a process 201 for efficiently implementing a multiplicative inverse of an AES S-box. In the example illustrated below the composite field $GF(2^2)^4$ is used with the irreducible polynomial, $x^4+x^3+x^2+2$, for the S-box transformation.

Continuing from point 118 of process 101, at processing block 218 it is determined whether the process is encrypting, in which case processing continues in processing block 219. Otherwise if the process is decrypting, a field conversion was already performed in processing block 117 and the third corresponding polynomial representations of the 16 byte values are in the composite field $GF((2^2)^4)$. For one embodiment of processing block 117, an inverse affine transformation can be applied and a polynomial representation in the composite field $GF((2^4)^2)$, $[a_6, a_5, a_4, a_3, a_2, a_1, a_0]$, can be converted to a corresponding polynomial representation in the composite field $GF((2^2)^4)$, $[b_y, b_6, b_5, b_4, b_3, b_2, b_1, b_0]$, by multiplication of each byte value with an 8-bit by 8-bit conversion matrix and XORs of some constants (i.e. bitwise inversions), which may be implemented by a series of XORs as follows:

$\neg b_0 = a_3 \oplus a_5 \oplus a_7$,
$b_1 = a_1 \oplus a_2 \oplus a_3 \oplus a_4$,
$b_2 = a_0 \oplus a_2 \oplus a_4 \oplus a_5 \oplus a_6$,
$b_3 = a_0 \oplus a_1 \oplus a_2 \oplus a_4 \oplus a_5 \oplus a_6$,
$\neg b_4 = a_1 \oplus a_6$, $b_5=a_0 \oplus a_1 \oplus a_2 \oplus a_3 \oplus a_5 \oplus a_6 \oplus a_7$,
$\neg b_6=a_0 \oplus a_5 \oplus a_6$,
$b_7=a_0 \oplus a_1 \oplus a_2 \oplus a_3 \oplus a_4 \oplus a_6$.

In processing block 219 a field conversion is needed for the encryption process and so a field conversion circuit is used to convert each of the 16 byte values, respectively, from a corresponding polynomial representation in GF(256) to a corresponding polynomial representation in the composite field GF($(2^2)^4$). For one embodiment of processing block 219, a polynomial representation in GF(256), [$a_7, a_6, a_5, a_4, a_3, a_2, a_1, a_0$], can be converted to a corresponding polynomial representation in the composite field GF($(2^2)^4$), [$b_7, b_6, b_5, b_4, b_3, b_2, b_1, b_0$], by multiplication of each byte value with an 8-bit by 8-bit conversion matrix, which may be implemented by a series of XORs as follows:

$b_0=a_0 \oplus a_1 \oplus a_6$,
$b_1=a_1 \oplus a_4 \oplus a_6$,
$b_2=a_5 \oplus a_6 \oplus a_7$,
$b_3=a_3 \oplus a_4$,
$b_4=a_1 \oplus a_2 \oplus a_3 \oplus a_4 \oplus a_5$,
$b_5=a_3 \oplus a_4 \oplus a_5 \oplus a_7$,
$b_6=a_2 \oplus a_5 \oplus a_6$,
$b_7=a_3 \oplus a_7$.

In processing block 220 an inversion circuit is used to compute for each of the polynomial representations in GF($(2^2)^4$) of the 16 byte values, respectively, a multiplicative inverse polynomial representation in GF($(2^2)^4$). For one embodiment, an input corresponding to a polynomial representation in the composite field GF($(2^2)^4$), [a, b, c, d], and a multiplicative inverse, [A, B, C, D], are related as follows:

$$(a \oplus c \oplus d) \cdot A \oplus (b \oplus c) \cdot B \oplus (a \oplus b) \cdot C \oplus a \cdot D = 0$$

$$(2 \cdot a \oplus b \oplus c) \cdot A \oplus (a \oplus b \oplus d) \cdot B \oplus (a \oplus c) \cdot C \oplus b \cdot D = 0$$

$$(2 \cdot a \oplus 2 \cdot b) \cdot A \oplus (2 \cdot a) \cdot B \oplus d \cdot C \oplus c \cdot D = 0$$

$$(2 \cdot b \oplus 2 \cdot c) \cdot A \oplus (2 \cdot a \oplus 2 \cdot b) \cdot B \oplus (2 \cdot a) \cdot C \oplus d \cdot D = 1$$

where $\oplus$ and '·' denote the GF($2^2$) additions and multiplications, respectively.
The solution is: $A=\Delta^{-1} \cdot \Delta_a$, $B=\Delta^{-1} \cdot \Delta_b$, $C=\Delta^{-1} \cdot \Delta_c$, $D=\Delta^{-1} \cdot \Delta_d$, where the determinant $\Delta$ is given by:

$$\Delta = \begin{vmatrix} a \oplus c \oplus d & b \oplus c & a \oplus b & a \\ 2 \cdot a \oplus b \oplus c & a \oplus b \oplus d & a \oplus c & b \\ 2 \cdot a \oplus 2 \cdot b & 2 \cdot a & d & c \\ 2 \cdot b \oplus 2 \cdot c & 2 \cdot a \oplus 2 \cdot b & 2 \cdot a & d \end{vmatrix}$$

and the determinants $\Delta_a$, $\Delta_b$, $\Delta_c$ and $\Delta_d$ result from A by replacing the first, second, third and fourth columns of $\Delta$ with $\{0, 0, 0, 1\}$ respectively. Again it will be appreciated that such computations may be carried out in GF($2^2$) by expanding the determinant calculation, computing the unique terms in hardware, such as $a^2$, $b^2$, $a^3$, $3 \cdot b^2$, etc. and the unique sums of terms required, and then summing the particular term combinations to generate the necessary results.

In processing block 221 it is determined whether the process is decrypting, in which case processing continues in processing block 222. In processing block 222 another field conversion circuit is used to convert each of the 16 byte values, respectively, from a corresponding polynomial representation in the composite field GF($(2^2)^4$) to a corresponding polynomial representation in GF(256). For one embodiment of processing block 222, a polynomial representation in the composite field GF($(2^2)^4$), [$a_7, a_6, a_5, a_4, a_3, a_2, a_1, a_0$], can be converted to a corresponding polynomial representation in GF(256), [$b_7, b_6, b_5, b_4, b_3, b_2, b_1, b_0$], by multiplication of each byte value with an 8-bit by 8-bit conversion matrix, which may be implemented by a series of XORs as follows:

$b_0=a_0 \oplus a_3 \oplus a_4 \oplus a_6$,
$b_1=a_2 \oplus a_4 \oplus a_5 \oplus a_6$,
$b_2=a_1 \oplus a_2 \oplus a_4 \oplus a_7$,
$b_3=a_1 \oplus a_4 \oplus a_6$,
$b_4=a_1 \oplus a_3 \oplus a_4 \oplus a_6$,
$b_5=a_1 \oplus a_3 \oplus a_4 \oplus a_5 \oplus a_6 \oplus a_7$,
$b_6=a_2 \oplus a_3 \oplus a_5$,
$b_7=a_1 \oplus a_4 \oplus a_6 \oplus a_7$.

Otherwise if the process is encrypting, processing proceed to processing block 121 of process 101. As it was explained with regard to processing block 122 of process 101, the circuit that is used to apply an affine transformation to the 16 bytes in processing block 122 can be combined with the field conversion circuit of this embodiment to convert the 16 byte values from polynomial representations in GF($(2^2)^4$) to corresponding polynomial representations in GF(256). For one embodiment of processing block 122, an affine transformation can be applied and a polynomial representation in the composite field GF($(2^2)^4$)), [$a_7, a_6, a_5, a_4, a_3, a_2, a_1, a_0$], can be converted to a corresponding polynomial representation in GF(256), [$b_7, b_6, b_5, b_4, b_3, b_2, b_1, b_0$], by multiplication of each byte value with an 8-bit by 8-bit conversion matrix and XORs with some constants (i.e. bitwise inversions), which may be implemented by a series of XORs as follows:

$\neg b_0=a_0 \oplus a_1 \oplus a_2$,
$\neg b_1=a_0 \oplus a_3 \oplus a_5$,
$b_2=a_0 \oplus a_2 \oplus a_6$,
$b_3=a_0 \oplus a_1 \oplus a_3 \oplus a_4 \oplus a_5$,
$b_4=a_0 \oplus a_1 \oplus a_4 \oplus a_5 \oplus a_7$,
$\neg b_5=a_4$,
$\neg b_6=a_3 \oplus a_6$,
$b_7=a_2 \oplus a_3$.

Figure 3A:
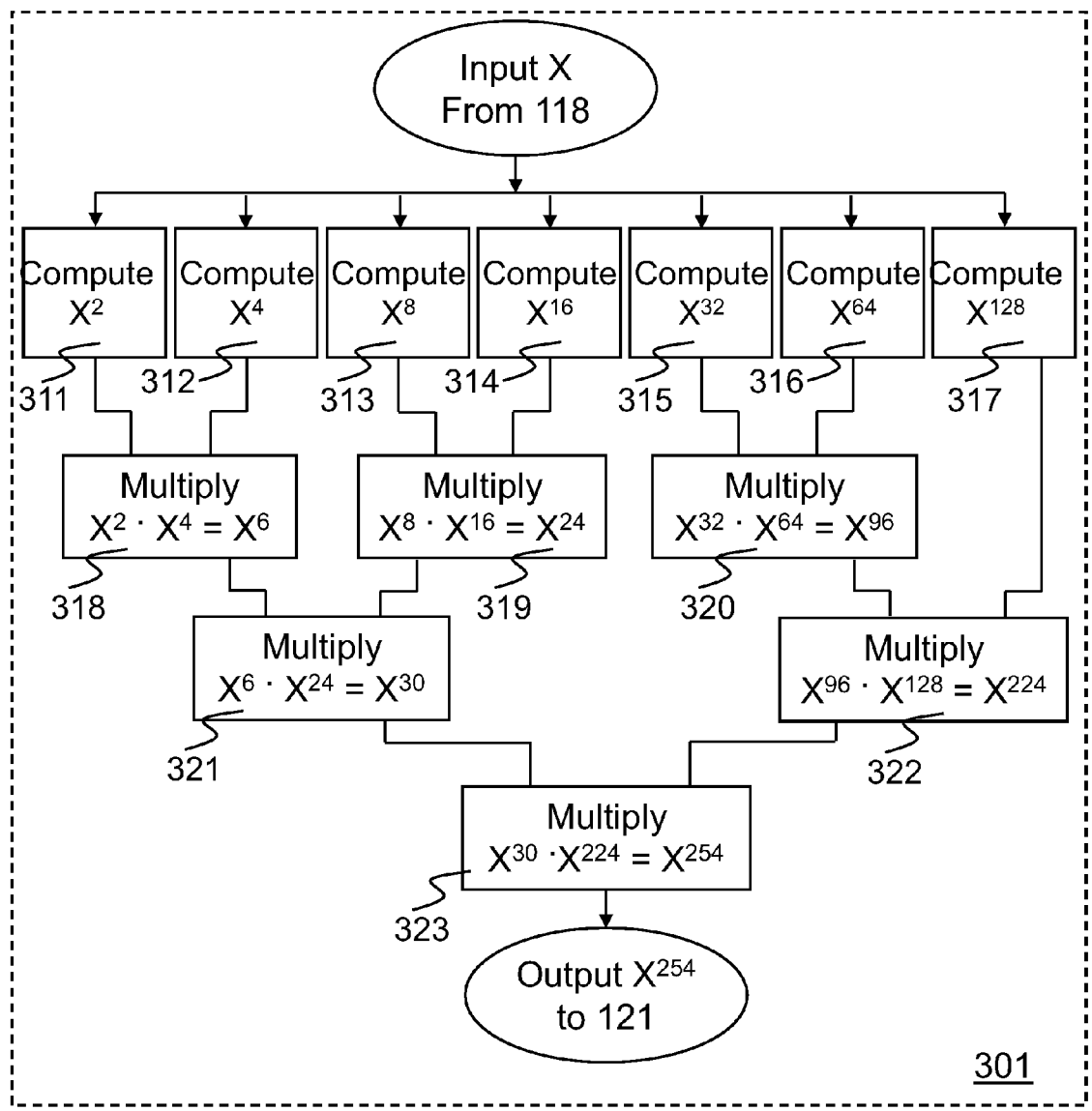
FIG. 3a illustrates a flow diagram for an alternative embodiment of a process for efficiently implementing a multiplicative inverse of an AES S-box.

FIG. 3a illustrates a flow diagram for an alternative embodiment of a process 301 for efficiently implementing a multiplicative inverse of an AES S-box on a 128-bit block including 16 byte values, each byte having a polynomial representation in GF(256). In process 301 we consider each byte X being input from point 118 of process 101. Processing blocks 311-317 comprise a byte slice of a polynomial-powers generating circuit to compute for each of the 16 byte values, respectively, byte values having polynomial representations in GF(256) corresponding to powers, $X^2$, $X^4$, $X^8$, $X^{16}$, $X^{32}$, $X^{64}$ and $X^{128}$ of the polynomial representation of their respective byte value X. Processing blocks 318-323 comprise a byte slice of a multiplier circuit to multiply together in GF(256) the byte values corresponding to powers of the polynomial representations for each of the 16 byte values, respectively, to produce 16 byte values each having a polynomial representation in GF(256) corresponding to the multiplicative inverse, $X^{-1}=X^{254}$, of their respective byte value X. These 16 multiplicative inverse byte values are then output to processing block 121 of process 101 where an affine transform circuit is optionally used in processing block 122 to apply an affine transformation dependent upon whether process 101 is performing encryption or decryption.

Figure 3B:
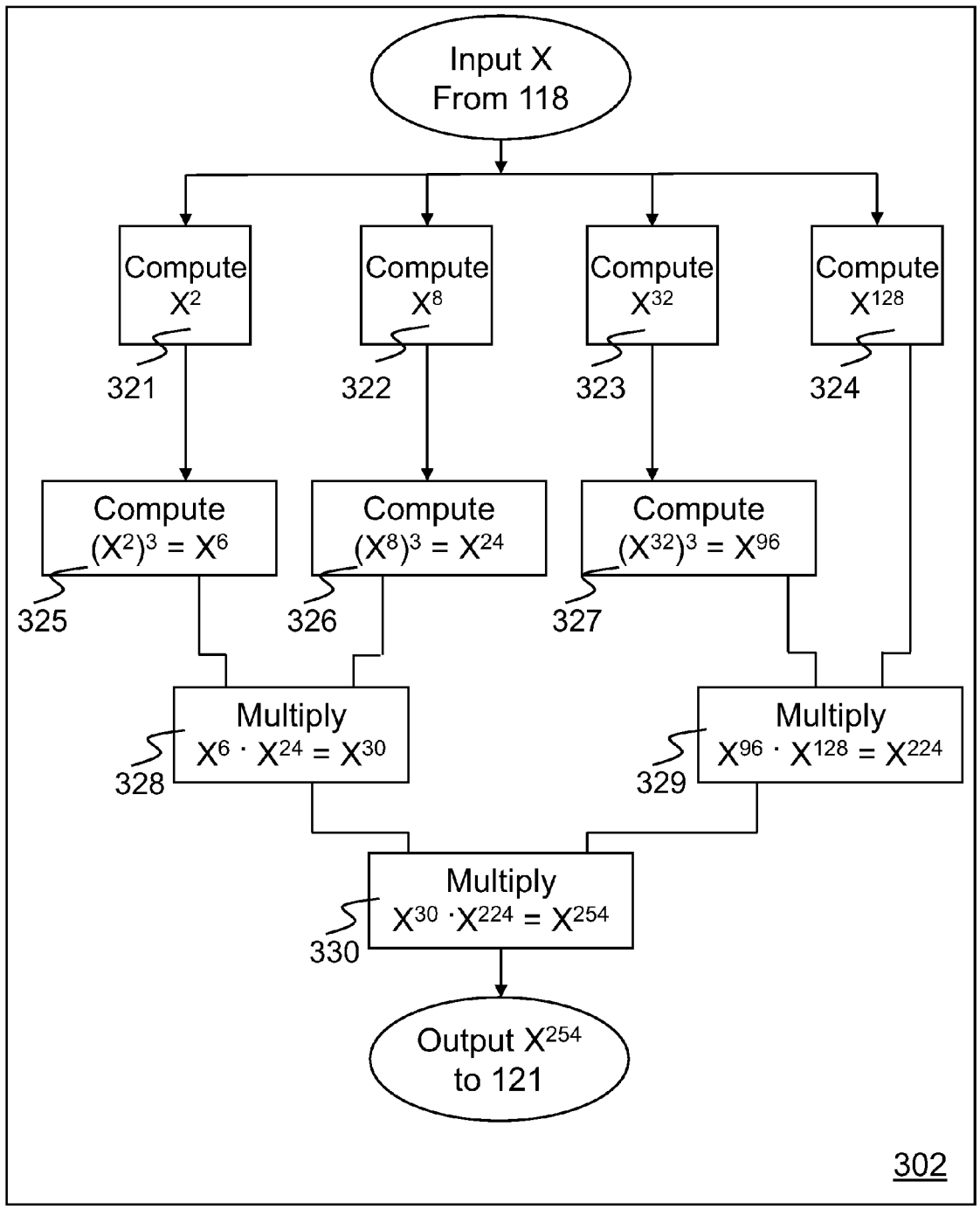
FIG. 3b illustrates a flow diagram for another alternative embodiment of a process for efficiently implementing a multiplicative inverse of an AES S-box

FIG. 3b illustrates a flow diagram for another alternative embodiment of a process 302 for efficiently implementing a multiplicative inverse of an AES S-box on 16 byte values having polynomial representations in GF(256). In process 302 we again consider each byte X being input from point 118 of process 101. Processing blocks 321-327 comprise a byte slice of a polynomial-powers generating circuit to compute for each of the 16 byte values, respectively, byte values having polynomial representations in GF(256) corresponding to powers, $X^6$, $X^{24}$, $X^{96}$ and $X^{128}$ of the polynomial representation of their respective byte value X. Processing blocks 328-330 comprise a byte slice of a multiplier circuit to multiply together in GF(256) the byte values corresponding to powers of the polynomial representations for each of the 16 byte values, respectively, to produce 16 byte values each having a polynomial representation in GF(256) corresponding to the multiplicative inverse, $X^{-1}=X^{254}$, of their respective byte value X. The 16 multiplicative inverse byte values are output to processing block 121 of process 101 where an affine transform circuit is optionally used in processing block 122 to apply an affine transformation dependent upon whether process 101 is performing encryption or decryption.

It will be appreciated that the circuits illustrated for embodiments of the invention in FIGS. 3a and 3b are not unique and can be modified in arrangement and detail by those skilled in the art, and that many different combinations of byte values corresponding to powers of the polynomial could be generated and multiplied together without departing from the principles of the present invention.

The above description, in general, is intended to illustrate preferred embodiments of the present invention. From the discussion above it should also be apparent that especially in such an area of technology, where growth is fast and further advancements are not easily foreseen, the invention can be modified in arrangement and detail by those skilled in the art without departing from the principles of the present invention within the scope of the accompanying claims and their equivalents.

What is claimed is:

1. An apparatus comprising:
   a first field conversion circuit to convert each of a plurality of 16 byte values of a block, respectively, from a first corresponding polynomial representation in GF(256) to a second corresponding polynomial representation in $GF((2^2)^4)$;
   a multiplicative inverse circuit to compute for each of the second corresponding polynomial representations in $GF((2^2)^4)$ of the 16 byte values, respectively, a corresponding multiplicative inverse polynomial representation in $GF((2^2)^4)$; and
   a second field conversion circuit to convert each corresponding multiplicative inverse polynomial representation in $GF((2^2)^4)$ and to apply an affine transformation by performing a multiplication of each corresponding multiplicative inverse polynomial representation with an 8-bit by 8-bit product matrix and a subsequent XOR with a constant byte value to generate, respectively, a third corresponding polynomial representation in GF(256) wherein the multiplication of each corresponding multiplicative inverse polynomial representation with an 8-bit by 8-bit product matrix and a subsequent XOR with a constant byte value is implemented by a series of XORs.

2. The apparatus of claim 1 wherein conversion of each of the 16 byte values to a second corresponding polynomial representation in $GF((2^2)^4)$ is performed by a multiplication of each of the 16 byte values with an 8-bit by 8-bit conversion matrix.

3. The apparatus of claim 2 wherein the multiplication of each byte value with an 8-bit by 8-bit conversion matrix is implemented by a series of XORs according to:
   $b_0 = a_0 \oplus a_1 \oplus a_6$,
   $b_1 = a_1 \oplus a_4 \oplus a_6$,
   $b_2 = a_5 \oplus a_6 \oplus a_7$,
   $b_3 = a_3 \oplus a_4$,
   $b_4 = a_1 \oplus a_2 \oplus a_3 \oplus a_4 \oplus a_5$,
   $b_5 = a_3 \oplus a_4 \oplus a_5 \oplus a_7$,
   $b_6 = a_2 \oplus a_5 \oplus a_6$,
   $b_7 = a_3 \oplus a_7$,
   where $[a_7, a_6, a_5, a_4, a_3, a_2, a_1, a_0]$ is the first corresponding polynomial representation in GF(256) and $[b_7, b_6, b_5, b_4, b_3, b_2, b_1, b_0]$ is the second corresponding polynomial representation in $GF((2^2)^4)$.

4. The apparatus of claim 1 wherein conversion, in the second field conversion circuit, of each corresponding multiplicative inverse polynomial representation in $GF((2^2)^4)$ and application of the affine transformation is performed by multiplication of each byte value with an 8-bit by 8-bit matrix and XORs with a set of constants according to:
   $\neg b_0 = a_0 \oplus a_1 \oplus a_2$,
   $\neg b_1 = a_0 \oplus a_3 \oplus a_5$,
   $b_2 = a_0 \oplus a_2 \oplus a_6$,
   $b_3 = a_0 \oplus a_1 \oplus a_3 \oplus a_4 \oplus a_5$,
   $b_4 = a_0 \oplus a_1 \oplus a_4 \oplus a_5 \oplus a_7$,
   $\neg b_5 = a_4$,
   $\neg b_6 = a_3 \oplus a_6$,
   $b_7 = a_2 \oplus a_3$,
   where $[a_7, a_6, a_5, a_4, a_3, a_2, a_1, a_0]$ is the multiplicative inverse polynomial representation in $GF((2^2)^4)$ and $[b_7, b_6, b_5, b_4, b_3, b_2, b_1, b_0]$ is the third corresponding polynomial representation in GF(256).

5. A method comprising:
   converting, in a first field conversion circuit, each of a plurality of 16 byte values of a block, respectively, from a first corresponding polynomial representation in GF(256) to a second corresponding polynomial representation in $GF((2^2)^4)$;
   computing, in a multiplicative inverse circuit, for each of the second corresponding polynomial representations in $GF((2^2)^4)$ of the 16 byte values, respectively, a corresponding multiplicative inverse polynomial representation in $GF((2^2)^4)$;
   converting, in a second field conversion circuit, each corresponding multiplicative inverse polynomial representation in $GF((2^2)^4)$ and applying an affine transformation, by performing a multiplication of each corresponding multiplicative inverse polynomial representation with an 8-bit by 8-bit product matrix and a subsequent XOR with a constant byte value to generate, respectively, a third corresponding polynomial representation in GF(256) wherein the multiplication of each corresponding multiplicative inverse polynomial representation with an 8-bit by 8-bit product matrix and a subsequent XOR with a constant byte value is implemented by a series of XORs.

6. The method of claim 5 wherein converting each of the 16 byte values to a second corresponding polynomial representation in $GF((2^2)^4)$ is performed by a multiplication of each of the 16 byte values with an 8-bit by 8-bit conversion matrix.

7. The method of claim 6, further comprising multiplying each byte value with the 8-bit by 8-bit conversion matrix according to:
   $b_0 = a_0 \oplus a_1 \oplus a_6$,
   $b_1 = a_1 \oplus a_4 \oplus a_6$,
   $b_2 = a_5 \oplus a_6 \oplus a_7$,
   $b_3 = a_3 \oplus a_4$,
   $b_4 = a_1 \oplus a_2 \oplus a_3 \oplus a_4 \oplus a_5$,
   $b_5 = a_3 \oplus a_4 \oplus a_5 \oplus a_7$,
   $b_6 = a_2 \oplus a_5 \oplus a_6$,
   $b_7 = a_3 \oplus a_7$, where $[a_7, a_6, a_5, a_4, a_3, a_2, a_1, a_0]$ is the first corresponding polynomial representation in GF(256) and $[b_7, b_6, b_5, b_4, b_3, b_2, b_1, b_0]$ is the second corresponding polynomial representation in $GF((2^2)^4)$.

8. The method of claim 5 wherein conversion, in the second field conversion circuit, each corresponding multiplicative inverse polynomial representation in $GF((2^2)^4)$ and applying the affine transformation is performed by multiplication of each byte value with an 8-bit by 8-bit matrix and XORs with a set of constants according to:
¬ $b_0 = a_0 \oplus a_1 \oplus a_2$,
¬ $-b_1 = a_0 \oplus a_3 \oplus a_5$,
$b_2 = a_0 \oplus a_2 \oplus a_6$,
$b_3 = a_0 \oplus a_1 \oplus a_3 \oplus a_4 \oplus a_5$,
$b_4 = a_0 \oplus a_1 \oplus a_4 \oplus a_5 \oplus a_7$,
¬ $b_5 = a_4$,
¬ $b_6 = a_3 \oplus a_6$,
$b_7 = a_2 \oplus a_3$,
where $[a_7, a_6, a_5, a_4, a_3, a_2, a_1, a_0]$ is the multiplicative inverse polynomial representation in $GF((2^2)^4)$ and $[b_7, b_6, b_5, b_4, b_3, b_2, b_1, b_0]$ is the third corresponding polynomial representation in GF(256).

9. An apparatus implementing an Advanced Encryption Standard (AES) encryption or decryption process, the apparatus comprising:
a first field conversion circuit to convert each of a first plurality of 16 byte values, respectively, from a first corresponding polynomial representation in GF(256) when performing encryption, and in $GF((2^4)^2)$ when performing decryption, to a second corresponding polynomial representation in $GF((2^2)^4)$;
a multiplicative inverse circuit to compute a corresponding multiplicative inverse polynomial representation in $GF((2^2)^4)$ for each of a plurality of 16 byte values of a second corresponding polynomial representation in $GF((2^2)^4)$; and
a second field conversion circuit to compute a multiplication of each corresponding multiplicative inverse polynomial representation in $GF((2^2)^4)$ with an 8-bit by 8-bit product matrix and an optional a subsequent XOR with a set of constants when performing encryption, and to compute a multiplication of each corresponding multiplicative inverse polynomial representation in $GF((2^2)^4)$ with an 8-bit by 8-bit conversion matrix when performing decryption, each multiplication and subsequent XOR and each multiplication, respectively, being implemented by a series of XORs to generate, respectively, a third corresponding polynomial representation in GF(256).

10. The apparatus of claim 9 wherein computing the multiplication of each corresponding multiplicative inverse polynomial representation in $GF((2^2)^4)$ with an 8-bit by 8-bit matrix and the subsequent XORs with the set of constants when performing encryption is implemented by a series of XORs according to:
¬ $b_0 = a_0 \oplus a_1 \oplus a_2$,
¬ $b_1 = a_0 \oplus a_3 \oplus a_5$,
$b_2 = a_0 \oplus a_2 \oplus a_6$,
$b_3 = a_0 \oplus a_1 \oplus a_3 \oplus a_4 \oplus a_5$,
$b_4 = a_0 \oplus a_1 \oplus a_4 \oplus a_5 \oplus a_7$,
¬ $b_5 = a_4$,
¬ $b_6 = a_3 \oplus a_6$,
$b_7 = a_2 \oplus a_3$,
where $[a_7, a_6, a_5, a_4, a_3, a_2, a_1, a_0]$ is the multiplicative inverse polynomial representation in $GF((2^2)^4)$ and $[b_7, b_6, b_5, b_4, b_3, b_2, b_1, b_0]$ is the third corresponding polynomial representation in GF(256).

11. The apparatus of claim 10 wherein converting each of the 16 byte values to a second corresponding polynomial representation in $GF((2^2)^4)$ is performed by a multiplication of each of the 16 byte values with a second 8-bit by 8-bit conversion matrix.

12. The apparatus of claim 11 wherein the multiplication of each of the 16 byte values with the second 8-bit by 8-bit conversion matrix is implemented by a series of XORs according to:
$b_0 = a_0 \oplus a_1 \oplus a_6$,
$b_1 = a_1 \oplus a_4 \oplus a_6$,
$b_2 = a_5 \oplus a_6 \oplus a_7$,
$b_3 = a_3 \oplus a_4$,
$b_4 = a_1 \oplus a_2 \oplus a_3 \oplus a_4 \oplus a_5$,
$b_5 = a_3 \oplus a_4 \oplus a_5 \oplus a_7$,
$b_6 = a_2 \oplus a_5 \oplus a_6$,
$b_7 = a_3 \oplus a_7$,
where $[a_7, a_6, a_5, a_4, a_3, a_2, a_1, a_0]$ is the first corresponding polynomial representation in GF(256) and $[b_7, b_6, b_5, b_4, b_3, b_2, b_1, b_0]$ is the second corresponding polynomial representation in $GF((2^2)^4)$.

13. The apparatus of claim 9 wherein computing the multiplication of each corresponding multiplicative inverse polynomial representation in $GF((2^2)^4)$ with an 8-bit by 8-bit conversion matrix when performing decryption is implemented by a series of XORs according to:
$b_0 = a_0 \oplus a_3 \oplus a_4 \oplus a_6$,
$b_1 = a_2 \oplus a_4 \oplus a_5 \oplus a_6$,
$b_2 = a_1 \oplus a_2 \oplus a_4 \oplus a_7$,
$b_3 = a_1 \oplus a_4 \oplus a_6$,
$b_4 = a_1 \oplus a_3 \oplus a_4 \oplus a_6$,
$b_5 = a_1 \oplus a_3 \oplus a_4 \oplus a_5 \oplus a_6 \oplus a_7$,
$b_6 = a_2 \oplus a_3 \oplus a_5$,
$b_7 = a_1 \oplus a_4 \oplus a_6 \oplus a_7$,
where $[a_7, a_6, a_5, a_4, a_3, a_2, a_1, a_0]$ is the multiplicative inverse polynomial representation in $GF((2^2)^4)$ and $[b_7, b_6, b_5, b_4, b_3, b_2, b_1, b_0]$ is the third corresponding polynomial representation in GF(256).

14. The apparatus of claim 13 comprising:
an inverse-columns-mixing circuit to compute an inverse-columns-mixing transformation of 16 byte values, in the first polynomial representation to get a corresponding transformed first plurality of 16 byte values in the first corresponding polynomial representation, wherein said first field conversion circuit is to convert each of the first plurality of 16 byte values, respectively, from said first corresponding polynomial representation to the second corresponding polynomial representation in $GF((2^2)^4)$.

15. The apparatus of claim 14, wherein said first field conversion circuit performs the multiplication of each of the 16 byte values with a second 8-bit by 8-bit conversion matrix by a series of XORs and bitwise inversions according to:
¬ $b_0 = a_3 \oplus a_5 \oplus a_7$,
$b_1 = a_1 \oplus a_2 \oplus a_3 \oplus a_4$,
$b_2 = a_0 \oplus a_2 \oplus a_4 \oplus a_5 \oplus a_6$,
$b_3 = a_0 \oplus a_1 \oplus a_2 \oplus a_4 \oplus a_5 \oplus a_6$,
¬ $b_4 = a_1 \oplus a_6$,
$b_5 = a_0 \oplus a_1 \oplus a_2 \oplus a_3 \oplus a_5 \oplus a_6 \oplus a_7$,
¬ $b_6 = a_0 \oplus a_5 \oplus a_6$,
$b_7 = a_0 \oplus a_1 \oplus a_2 \oplus a_3 \oplus a_4 \oplus a_6$,
where $[a_7, a_6, a_5, a_4, a_3, a_2, a_1, a_0]$ is the first corresponding polynomial representation and $[b_7, b_6, b_5, b_4, b_3, b_2, b_1, b_0]$ is the second corresponding polynomial representation in $GF((2^2)^4)$.

16. The apparatus of claim 15 wherein the first plurality of 16 byte values are in the first corresponding polynomial representation in $GF((2^4)^2)$.

17. The apparatus of claim 16 comprising:
a third field conversion circuit to convert each of the 16 byte values, respectively, from the third corresponding polynomial representation in GF(256) to the first corresponding polynomial representation in $GF((2^4)^2)$.

18. The apparatus of claim 17 wherein the conversion of each of the 16 byte values from the third corresponding polynomial representation in GF(256) to the first corresponding polynomial representation in $GF((2^4)^2)$ is implemented by a series of XORs according to:

$b_0 = a_0 \oplus a_2 \oplus a_3 \oplus a_4 \oplus a_5 \oplus a_6 \oplus a_7$,
$b_1 = a_7$,
$b_2 = a_4 \oplus a_5 \oplus a_7$,
$b_3 = a_1 \oplus a_3 \oplus a_5 \oplus a_6$,
$b_4 = a_4 \oplus a_5 \oplus a_6$,
$b_5 = a_1 \oplus a_4 \oplus a_5 \oplus a_6$,
$b_6 = a_5 \oplus a_7$,
$b_7 = a_2 \oplus a_3 \oplus a_4 \oplus a_6 \oplus a_7$, where $[a_7, a_6, a_5, a_4, a_3, a_2, a_1, a_0]$ is the third corresponding polynomial representation in GF(256) and $[b_7, b_6, b_5, b_4, b_3, b_2, b_1, b_0]$ is the first corresponding polynomial representation in $GF((2^4)^2)$.

* * * * *

UNITED STATES PATENT AND TRADEMARK OFFICE
CERTIFICATE OF CORRECTION

Page 1 of 1

PATENT NO. : 8,923,510 B2
APPLICATION NO. : 11/966658
DATED : December 30, 2014
INVENTOR(S) : Gueron et al.

It is certified that error appears in the above-identified patent and that said Letters Patent is hereby corrected as shown below:

In the claims

Column 9, Line 40: Claim 9 which reads "product matrix and an optional a subsequent XOR with" should read "product matrix and a subsequent XOR with".

Signed and Sealed this
Sixth Day of October, 2015

Michelle K. Lee
*Director of the United States Patent and Trademark Office*